Sept. 11, 1962 W. F. UNGASHICK 3,053,577
MATERIALS CONVEYING SYSTEM
Filed Sept. 29, 1960
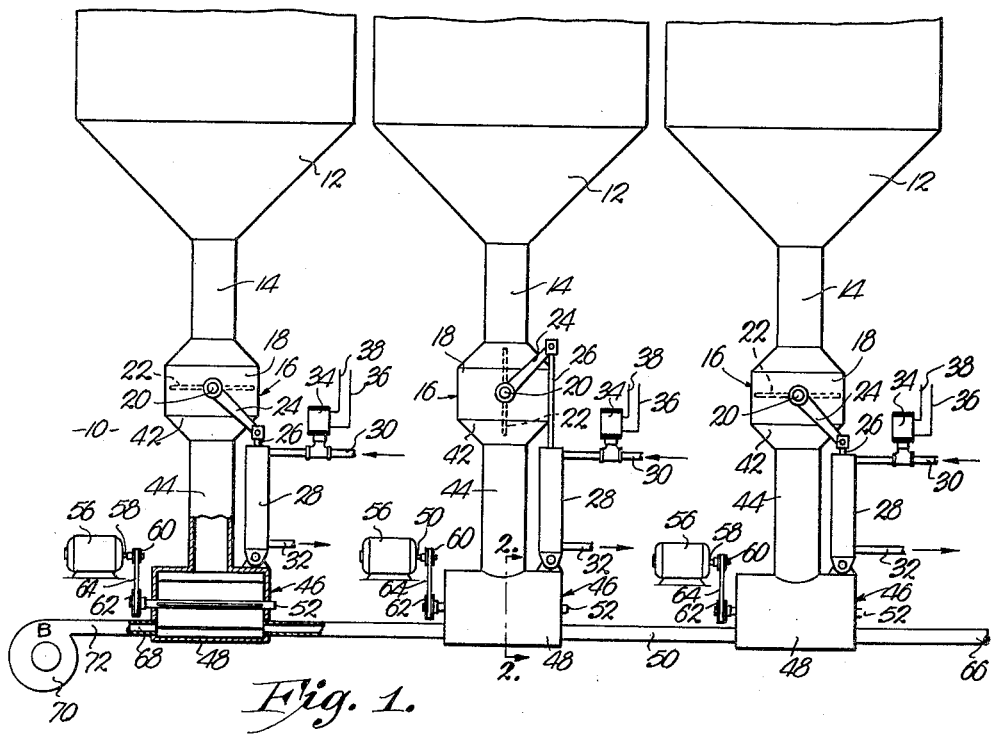
Fig. 1.
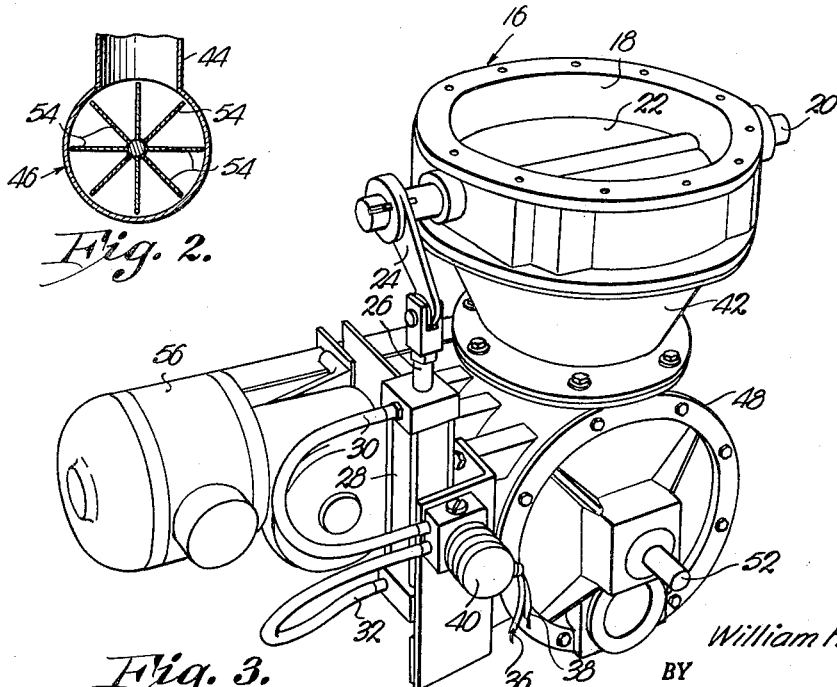
Fig. 2.
Fig. 3.
INVENTOR.
William F. Ungashick
BY
Hovey, Schmidt, Johnson & Hovey
ATTORNEY.

United States Patent Office 3,053,577
Patented Sept. 11, 1962

3,053,577
MATERIALS CONVEYING SYSTEM
William F. Ungashick, Kansas City, Mo., assignor to Schick Engineering Company, Kansas City, Mo., a corporation of Missouri
Filed Sept. 29, 1960, Ser. No. 59,247
4 Claims. (Cl. 302—49)

The present invention relates to a materials conveying system and more particularly to a materials conveying system having structure therein which particularly adapts it to convey powdered or granular materials.

In the past various constructions of materials conveying systems have been tried. For example, it has been attempted to provide a materials conveying system wherein the hoppers containing the material to be conveyed are located in parallel in the flow circuit of the conveying fluid so that as each hopper is emptied it can be disconnected from the circuit by operation of valves designed to block the empty hopper from the circuit while continuing the rest of the circuit in operation. Such construction is costly because of the multiple numbers of valves required to make it operable and because of the room required for such a layout, and, further, because of the large amounts of conduit necessary to interconnect such a system in parallel.

Other attempts have been made to place a plurality of hoppers in series along a conveying conduit filled with a conveying fluid under pressure, but these have been disadvantageous because of the fact that the metering devices used to feed the material from the hopper into the conveying conduit did not operate as airtight valves. Therefore, if one of the hoppers were supposedly removed from the system the air under pressure would flow back through the metering valve and into the hopper, raising dust in the hopper and making it practically impossible to clean without shutting down the entire system. Further, even if the hopper were not empty and being cleaned, the feedback of the fluid under pressure into the bin would cause air pockets to form and the material would feed imperfectly from the hopper to the metering device, making it impossible to get accurate measurements of the material to be metered into the line.

The present invention proposes to provide a materials conveying system wherein the hoppers are located in series, eliminating the complex and costly valve and conduit structure of the parallel arrangement, and wherein further the drawbacks of the series arrangements of the past are obviated by a particular construction and arrangement of the component parts.

It is therefore the most important object of the present invention to provide a material conveying system which is constructed to overcome all of the above-mentioned problems of the prior art devices.

It is a further object of the present invention to provide a material conveying system wherein a plurality of hoppers can be connected into a conveying conduit with a metering device and valve arrangement such that each, any or all of the hoppers may be individually or collectively in any grouping shut off from the conduit without affecting any of the remaining hoppers which are connected and in such a manner that they are sealed from the fluid under pressure, permitting cleaning thereof without difficulty.

Further objects and advantages inherent in or apparent from the structure will be apparent as this description proceeds and are intended to be included in the scope of the appended claims.

In the drawings:

FIGURE 1 is a fragmentary, front elevational view of structure embodying the present invention with portions broken away to show details of construction and with some parts schematically illustrated;

FIG. 2 is a transverse, fragmentary, cross-sectional view taken on line 2—2 of FIG. 1, looking in the direction of the arrows; and FIG. 3 is a perspective view of a preferred construction of certain parts schematically illustrated in FIG. 1.

There is shown in the drawings and particularly in FIG. 1 a materials conveying system indicated generally by the number 10. The material conveying system 10 includes a plurality of hoppers each numbered 12 for containing material to be fed into the conveying system 10. Each hopper 12 has a discharge 14 connected to the bottom thereof and joining the hopper 12 to the inlet side 18 of a butterfly valve housing indicated generally by the number 16. There is journaled in each housing 16 a rotatable shaft 20 to which is mounted a wicket 22. The wickets 22 are illustrated in FIG. 1 in dotted line and the central wicket is shown in the open position, permitting material flow from discharge 14 through housing 16; whereas the two outside wickets are shown in the closed position blocking flow from discharge 14 through housing 16. A pivot link 24 is mounted to one end of shaft 20 which protrudes from housing 16. The end of pivot link 24 remote from shaft 20 is pivotally connected in a conventional manner to the piston 26 of a hydraulic ram 28.

Ram 28 has a fluid inlet conduit 30 connected to one end thereof and a fluid outlet conduit 32 connected to the other end thereof for the purpose of supplying hydraulic fluid such as air to operate the ram. Conventional means such as solenoid 34 connected by wires 36 and 38 are provided connected to solenoid 34 and are connected at their opposite end to a source of electricity (not shown). A switch 40 is provided as shown in FIG. 3 for operating the solenoid in a conventional manner to permit fluid flow to close the valve and to shut off fluid flow when it is desired to open the valve.

Valve housing 16 has an outlet side 42 to which is connected the material inlet 44 of a metering device indicated generally by the numeral 46.

Each metering device 46 is comprised of a housing 48 mounted in series with a materials conveying conduit 50. Referring now more specifically to FIG. 2, it will be noted that a shaft 52 is journaled in each housing 48 and that a plurality of vanes extend radially therefrom to a point adjacent housing 48. These vanes are indicated generally by the number 54. It will be seen that as the vanes rotate in a manner which will be subsequently described measured portions of material from material inlet 44 will be metered off by the vanes 54 and deposited in the conduit 50 within which housing 46 is mounted in series.

For the purpose of rotating shaft 52 an electric motor 56 or other prime mover may be supplied having an output shaft 58 on which is mounted a pulley 60. A similar pulley 62 is mounted on the respective shafts 52 and a belt 64 interconnects each pulley 62 with a pulley 60 to drivingly interconnect the shaft 52 with the motor 56. Of course, other means may be used, such as a gear box mechanism for driving shaft 52 and in fact in the preferred construction which is shown in FIG. 3 of the drawings electric motor 56 is in fact drivably interconnected with shaft 52 by such a gear box.

It will be also noted that, in accordance with FIG. 3 of the drawing in the preferred construction, hopper 12 may be mounted immediately to the inlet side 18 of the valve housing 16 while the outlet side 42 is bolted down to the top of the metering device housing 48.

Materials conveying conduit 50 has an outlet 66 and an inlet 68. To the inlet 68 is connected a blower schematically illustrated at 70 and of a very conventional type. Blower 70 has a discharge outlet 72 connected thereto and joining blower 70 with inlet 68.

In operation blower 70 creates a stream of air which it discharges through discharge 72 into inlet 68 of conduit 50.

Each of the hoppers 12 will normally be filled with material to be conveyed which will run down as illustrated in FIG. 1 due to the force of gravity through discharge 14 to the inlet side 18 of valve assembly 16. If the valves are in the position shown in the valve assembly 16 of the two outside constructions the material will be blocked by wicket 22 against further flow. However, if the wickets 22 are in the position shown in the central assembly the material will flow through valve assembly 16 out the discharge side 42 and into the materials inlet 44 of the metering device 46.

Each of the metering devices 46 in operation is driven through the belt 64 by an electric motor such as illustrated at 56 or, conversely, through a gear box assembly as indicated in FIG. 3 from a motor 56 to rotate the rotary feeder portion of the metering device shown in FIG. 2. Each successive vane 54 of the metering device in cooperation with shaft 52 and housing 48 defines a pie-shaped segment of a circle which will be filled with material to be conveyed as the piece which is pie-shaped passes under the materials inlet 44 and continuous rotation of the device will bring the filled section to the bottom of housing 48 which is in series with the conduit 50 and wherein the fluid flowing in conduit 50 for purposes of conveying will pick up the material so deposited and carry it down the conduit 50.

If the wicket 22 is in the closed position as shown in the outside assemblies of FIG. 1, then the motor 56 may be shut off and if the bin is empty it can be cleaned without shutting down the remainder of the system described. This is due to the fact that wicket 22 completely closes the bin 12 off from communication with the conduit 50 and, further, because of the fact that the vanes 54 of the metering device also act in a valving capacity when shut down so that fluid flowing through the conduit 50 is blocked from communication with valve housing 16 due to the positioning of the vanes 54, preventing communication between conduit 50 and valve housing 16.

It is therefore apparent that I have described a materials conveying system which accomplishes all of the objects of the invention. It is further apparent that various changes and modifications may be made in the structure described without departing from the intent and spirit of the invention and the scope of the appended claims and it is therefore intended that such modifications or changes be covered by the appended claims.

Having thus described the invention what is claimed as new and desired to be secured by Letters Patent is:

1. A materials conveying system comprising: an elongated conduit having a generally horizontal section; means connected to the conduit for forcing a conveying fluid therethrough under pressure; a plurality of metering devices connected in series to said section of the conduit, each of said devices being provided with a housing of greater transverse dimension than the conduit, and rotatably mounting a vane member disposed for rotation about an axis spaced from and parallel to the longitudinal axis of said section of the conduit; separate, selectively operable means coupled to each of said vane means for permitting selective operation thereof; a material hopper overlying each of said devices and located in vertical spaced relationship from the housings thereof; an upright material delivery member intercommunicating respective hoppers with portions of the housings therebelow spaced from said section of the conduit; valve means in each of said delivery members for permitting free passage of material from corresponding hoppers to the housings therebelow when a respective valve means is in an open position thereof, and for precluding passage of material as well as fluid from said conduit upwardly through a corresponding housing and the delivery member into the hopper thereabove when a respective valve means is in a closed position thereof; and separate, selectively operable mechanism coupled to respective valve means for shifting the latter between said open and closed positions thereof whereby closing of the valve means prevents fluid from passing from the conduit into the hopper associated with the closed valve means, when the hopper contains insufficient material to overcome the pressure of the fluid passing through said conduit.

2. A materials conveying system as set forth in claim 1 wherein said mechanism includes separate power operated means connected to the individual valve means for shifting the latter between the open and closed positions thereof, and selectively actuatable means operably coupled to each of said power operated means for permitting actuation of any combination of said power operated means.

3. A materials conveying system as set forth in claim 1 wherein each of said upright members is provided with an enlarged, generally cylindrical valve housing, and a butterfly wicket rotatably carried by a respective housing and swingable between the open and closed positions thereof, and said selectively operable power means includes mechanical advantage apparatus connected to said wicket for rotating the latter through selected increments.

4. A materials conveying system as set forth in claim 1 wherein said selectively operable means coupled to each of the vane means comprises an electrically actuated, independently operable prime mover.

References Cited in the file of this patent

UNITED STATES PATENTS

| | | |
|---|---|---|
| 1,192,858 | Callahan | Aug. 1, 1916 |
| 1,231,778 | Nall | July 3, 1917 |
| 1,882,861 | Moore | Oct. 18, 1932 |
| 2,030,553 | Tiley | Feb. 1, 1936 |
| 2,152,632 | Cassiere | Apr. 4, 1939 |
| 2,681,748 | Weller | June 22, 1954 |
| 2,901,133 | Weller | Aug. 25, 1959 |